United States Patent
Combes

(10) Patent No.: US 11,626,821 B2
(45) Date of Patent: Apr. 11, 2023

(54) SENSORLESS CONTROL OF A MOTOR BY VARIABLE FREQUENCY SIGNAL INJECTION

(71) Applicant: Schneider Toshiba Inverter Europe SAS, Pacy sur Eure (FR)

(72) Inventor: Pascal Combes, Vernon (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 0 days.

(21) Appl. No.: 17/543,835

(22) Filed: Dec. 7, 2021

(65) Prior Publication Data

US 2022/0200493 A1   Jun. 23, 2022

(30) Foreign Application Priority Data

Dec. 17, 2020   (EP) ..................................... 20306592

(51) Int. Cl.
  *H02P 6/18* (2016.01)
  *H02P 21/18* (2016.01)
  *H02P 21/24* (2016.01)
  *H02P 25/026* (2016.01)

(52) U.S. Cl.
  CPC .............. *H02P 6/183* (2013.01); *H02P 21/18* (2016.02); *H02P 21/24* (2016.02); *H02P 25/026* (2013.01)

(58) Field of Classification Search
  CPC .......... H02P 6/183; H02P 21/18; H02P 21/24; H02P 25/026; H02P 21/14; H02P 21/22; H02P 25/022; H02P 27/085; H02P 2207/05

USPC ............................... 318/400.02, 400.01, 700
See application file for complete search history.

(56) References Cited

U.S. PATENT DOCUMENTS 9,093,940 B2 *   7/2015   Xu ........................ H02P 21/18
2017/0201200 A1   7/2017   Hachiya et al.

FOREIGN PATENT DOCUMENTS

EP   3709500 A1   9/2020

OTHER PUBLICATIONS

European Search Report and Search Opinion dated May 18, 2021 for corresponding European Patent Application No. EP20306592.5, 8 pgs.

* cited by examiner

*Primary Examiner* — David Luo
(74) *Attorney, Agent, or Firm* — Locke Lord LLP

(57) ABSTRACT

A method for sensorless control of an electric motor implemented in a variable speed drive including: determining a control voltage to be applied to the motor; injecting a high frequency signal to the control voltage to obtain an excitation voltage, wherein one or more frequencies of the high frequency signal varies with time; applying the excitation voltage to the motor; measuring a current signal induced in the motor by the excitation voltage, wherein the current signal comprises a fundamental current, induced by the control voltage, and a disturbance current, induced by the high frequency signal; and demodulating the current signal.

13 Claims, 2 Drawing Sheets

SENSORLESS CONTROL OF A MOTOR BY VARIABLE FREQUENCY SIGNAL INJECTION

TECHNICAL FIELD

This disclosure relates to a control method for an electric motor. This disclosure also relates to a variable speed drive capable of controlling the electric motor. This disclosure also relates to an electric drive assembly comprising the variable speed drive and the electric motor.

BACKGROUND ART

Electric motors, such as induction motors or Permanent Magnet Synchronous Motors (PMSM), are commonly controlled by a Variable Speed Drive (VSD) using vector control. Vector control, or Field Oriented Control (FOC), determines the voltages to be sent to each of the motor's stator windings using two orthogonal components. One component defines the magnetic flux generated by the stator, while the other component corresponds to the torque as determined by the speed of the motor.

FOC relies on the correct acquisition of the motor's rotor position. Rotor position is typically obtained by means of an optical or magnetic transducer (encoder), or extra windings in the rotor (resolver). However, this introduces extra complexity in the system, as well as increases manufacturing cost and reduces reliability. Moreover, the use of optical encoders can be a source of measuring errors which could deteriorate FOC performance.

Tackling these issues has led to the development of sensorless control strategies. One type of sensorless control strategy is High Frequency (HF) signal injection. The strategy involves injecting a high frequency signal to the motor superimposed on the voltages and extracting the rotor's position from a high frequency current induced by the injected signal.

High frequency signal injection has been shown to produce good results compared to other sensorless control strategies, especially at low motor speeds. However, it has also been shown to produce acoustic noise, vibration and additional losses in the motor. Decreasing the amplitude of the high frequency signal may reduce the acoustic noise, but also decreases the Signal-to-Noise Ratio (SNR) which makes it more difficult to extract the information contained in the high frequency current.

The present invention aims to provide a high frequency signal injection control strategy which does not present the disadvantages mentioned above.

SUMMARY

It is proposed a method for sensorless control of an electric motor implemented in a variable speed drive, wherein the method comprises:
  determining a control voltage to be applied to the motor;
  injecting a high frequency signal to the control voltage to obtain an excitation voltage, wherein one or more frequencies of the high frequency signal varies with time;
  applying the excitation voltage to the motor;
  measuring a current induced in the motor by the excitation voltage, wherein the current comprises a fundamental current, induced by the control voltage, and a disturbance current, induced by the high frequency signal;
  demodulating the current signal, wherein demodulating the current signal comprises:
    applying a first finite impulse response filter to the current signal to extract the fundamental current, wherein a duration of a response from the first finite impulse response filter varies according to the one or more frequencies of the high frequency signal, and subtracting the fundamental current from the current signal to extract the disturbance current;
    determining an amplitude of a ripple of the disturbance current, the amplitude of the ripple depending on the state the motor.

Thus, the variable frequency or frequencies of the high frequency signal can spread the spectrum of acoustic noise produced by the motor when the excitation voltage is applied to the motor. Moreover, demodulating the current signal to obtain motor information is adapted to the varying frequency or frequencies of the high frequency signal.

The following features, can be optionally implemented, separately or in combination one with the others:
  determining the amplitude of the ripple comprises calculating a zero-mean primitive of the high frequency signal and multiplying the disturbance current by the zero-mean primitive;
  determining the amplitude of the ripple further comprises applying a second finite impulse response filter, wherein a duration of a response from the second finite impulse response filter varies according to the one or more frequencies of the high frequency signal;
  the one or more frequencies of the high frequency signal vary randomly with time;
  the high frequency signal is a sinusoidal signal;
  the high frequency signal is a square wave signal;
  determining the control voltage comprises using a current controller, applying the excitation voltage to the motor comprises converting the excitation voltage to a pulse width modulation voltage using a pulse width modulation carrier, and a fundamental frequency of the high frequency signal are within an interval defined by a frequency bandwidth of the current controller and a frequency of the pulse width modulation carrier;
  a fundamental frequency of the high frequency signal varies between 250 Hz and 1 kHz;
  the control voltage is determined in an estimated rotor reference frame of the motor, and the high frequency signal is injected into the estimated rotor reference frame;
  the control method further comprises forming a feedback loop by updating the control voltage with the amplitude of the ripple and the fundamental current.

In another aspect, it is proposed a variable speed drive of an electric motor comprising a processor and a memory, the processor being configured to operate according to any of the above method.

In another aspect, it is proposed an electric drive assembly comprising the variable speed drive and an electric motor controlled by said variable speed drive.

In yet another aspect, it is proposed a computer-readable storage medium comprising instructions which, when executed by a processor, cause the processor to carry out the above method.

BRIEF DESCRIPTION OF THE DRAWINGS

Other features, details and advantages will be shown in the following detailed description and on the figures, on which.

DESCRIPTION OF EMBODIMENTS

Figure 1:
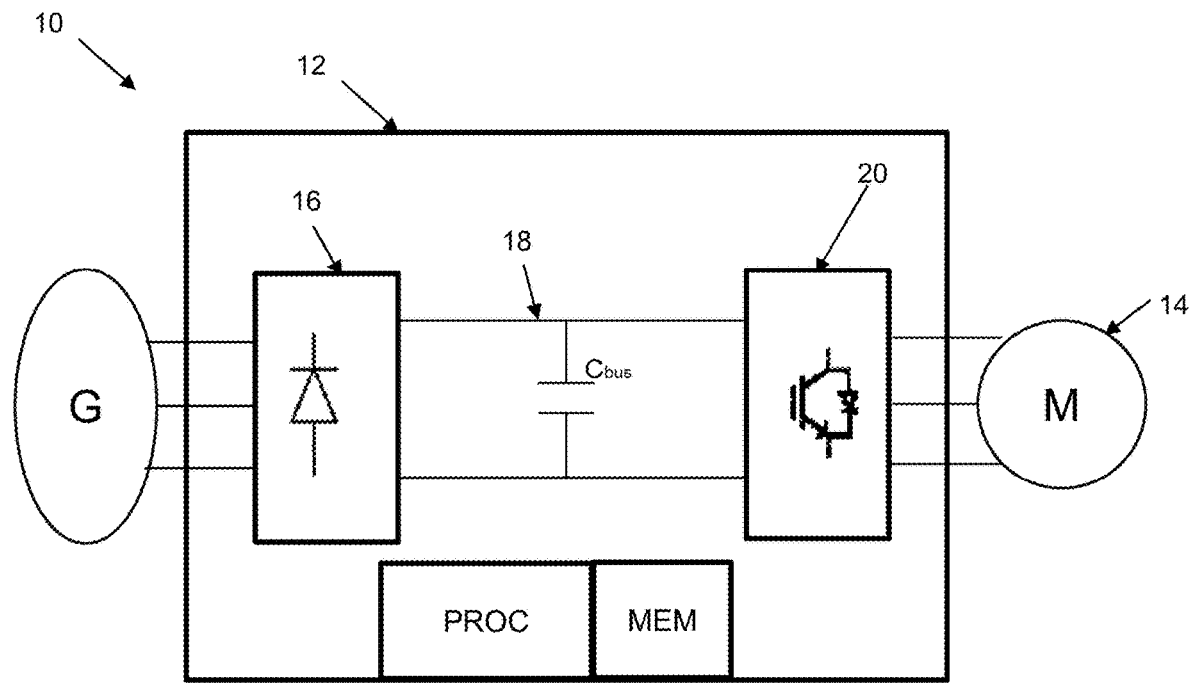
FIG. 1 schematically illustrates an example of a variable speed drive connected to an electrical grid and a motor.

FIG. 1 is a schematic diagram of an electric drive assembly 10 according to the present disclosure. The electric drive assembly 10 may be used in diverse industrial settings. For example, it may drive a fan of a heating, ventilation and air conditioning (HVAC) system. As another example, it may also be used to drive a water pump of a sewage installation. As yet another example, it may drive a conveyer on an assembly line. Many other industrial applications may be envisaged by the skilled person.

The electric drive assembly 10 comprises a variable speed drive 12, or VSD, and an electric motor 14.

Preferably, the electric motor 14 is an AC (Alternating Current) motor 14, preferably a synchronous motor, such as a permanent magnet synchronous motor (PMSM), or a synchronous reluctance motor (SynRM).

The variable speed drive 12 is electrically connected to the electric motor 14. The variable speed drive 12 controls the operation of the electric motor 14 according to a control method. The variable speed drive 12 enables the electric motor 14 to be operated at a speed desired for the application. The variable speed drive 12 also allows controlling the torque output of the electric motor 14 to a load.

The variable speed drive 12 generally comprises a rectifier module 16, a DC (Direct Current) power bus 18 and an inverter module 20.

The rectifier module 16 comprises a diode bridge configured to convert a 3-phase AC voltage provided by an electrical grid G to a DC voltage. The DC voltage outputted by the rectifier module 12 may be applied to the DC power bus 18.

The DC power bus 18 comprises two power lines connected together by a bus capacitor $C_{bus}$ configured to stabilize the voltage of the bus 18. The output of the DC power bus 18 may be connected to the inverter module 20.

The inverter module 20 comprises several switching arms each comprising power transistors, for example of the IGBT (Insulated Gate Bipolar Transistor) type. The inverter module 20 may be intended to cut off the voltage supplied by the DC power bus 16, to achieve a variable output voltage which can operate the electric motor 14.

In addition, the variable speed drive 12 comprises a processor PROC. The processor PROC controls the other electrical components of the variable speed drive 12. The processor PROC is configured to operate according to the control method. Processor PROC may comprise electronic circuits for computation managed by an operating system.

The variable speed drive 12 also comprises a non-transitory machine-readable or computer readable storage medium, such as, for example, memory or storage unit MEM, whereby the non-transitory machine-readable storage medium is encoded with instructions executable by processor PROC, the machine-readable storage medium comprising instructions to operate processor PROC to perform as per the control method. A computer readable storage according to this disclosure may be any electronic, magnetic, optical or other physical storage device that stores executable instructions. The computer readable storage may be, for example, Random Access Memory (RAM), an Electrically Erasable Programmable Read Only Memory (EEPROM), a storage drive, and optical disk, and the like.

Figure 2:
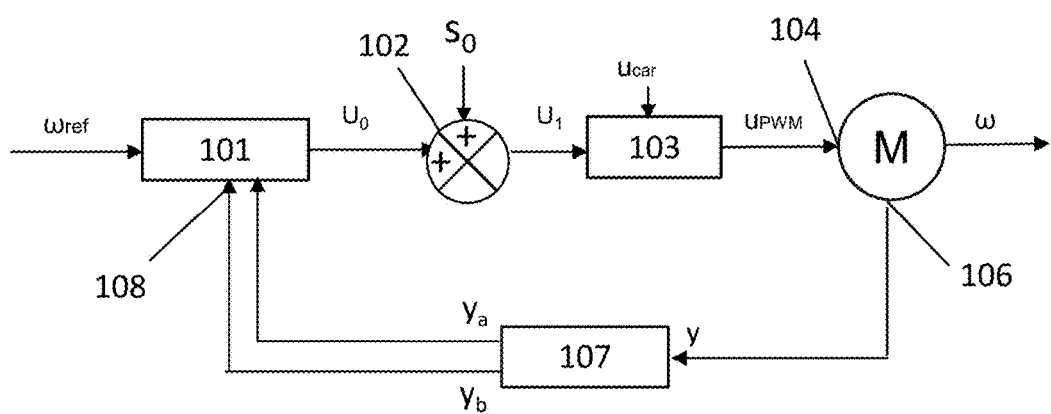
FIG. 2 schematically illustrates an example of a control system for the implementation of a control method to operate the motor of FIG. 1.

FIG. 2 illustrates a control system used by the variable speed drive 12 to control the operation of the motor 14. The control system enables the variable speed 12 drive to operate according to the control method described below.

The control method comprises, at step 101, determining a control voltage $u_0$. The control voltage $u_0$ is that which, when applied to the motor 14, will cause it to operate in the conditions desired for the application. For example, the control voltage $u_0$ may enable the motor 14 to operate at a desired speed.

Here, determining the control voltage $u_0$ of the motor 14 at step 101 is achieved through field oriented control, or FOC.

Figure 3:
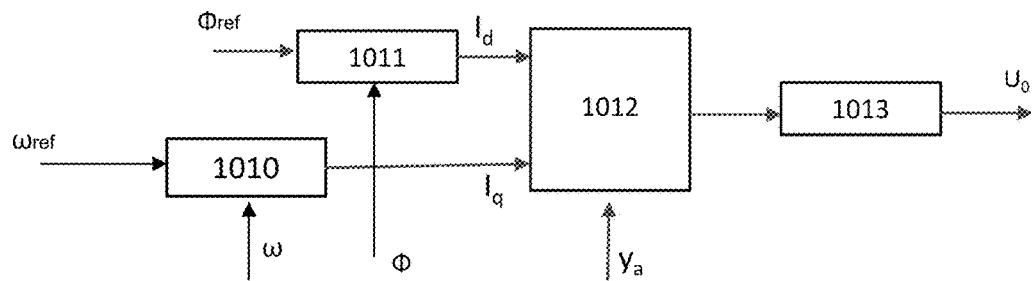
FIG. 3 schematically illustrates a detail of the control system of FIG. 2.

FIG. 3 illustrates in more detail step 101 of determining the control voltage $u_0$ using FOC.

As illustrated, determining the control voltage $u_0$ relies on a reference speed $\omega_{ref}$, a flux reference $\Phi_{ref}$ and information on the state of the motor 14. The speed reference $\omega_{ref}$ is that which the motor 14 is desired to operate at for the application. The flux reference $\Phi_{ref}$ may be derived from the speed reference $\omega_{ref}$ and motor specifications. Here, the information on the state of the motor 14 comprises a flux $\Phi$ and an actual speed w produced by the motor 14.

The information on the state of the motor is derived from measurements taken at the motor 14. The control system is a closed loop system. In other words, determining a control voltage $u_0$ is achieved by receiving feedback on the instantaneous status of the motor 14 during the operation of the motor 14. The variable speed drive 12 adjusts the control voltage $u_0$ based on the feedback received.

Here, measurements taken at the motor are "sensorless". The control method is a sensorless control method. This means that the feedback entirely relies on current measurements provided by current sensors embedded in the variable speed drive 12. There are no external sensors mounted on the motor 14, such as shaft encoders and the like, to provide feedback to the variable speed drive 12 on the status of the motor 14.

As illustrated in FIG. 3, determining the control voltage $u_0$ of the motor 14 comprises using a speed controller and a flux controller. The speed controller, at step 1010, derives a torque producing current $I_q$ from the reference speed $\omega_{ref}$ and the actual speed $\omega$ of the motor 14. The flux controller, at step 1011, derives a magnetizing current $I_d$ from the flux reference $\Phi_{ref}$ and the actual flux $\Phi$ of the motor 14. The speed and the flux controllers may derive the torque producing current and the magnetizing current using proportional integral (PI) control. The torque producing current $I_q$ and the magnetizing current $I_d$ are two orthogonal signals.

Determining the control voltage $u_0$ also comprises, at step 1012, using a current controller. The current controller converts the two orthogonal signals $I_q$, $I_d$ into the control voltage $u_0$. The current controller may convert the two orthogonal signals $I_q$, $I_d$ using the current measurements taken at the motor 14. It should be noted that the control voltage $u_0$ determined according to FOC also comprises two orthogonal components (not represented here for simplicity).

Determining the control voltage $u_0$ further comprises, at step 1013, changing the reference frame of the control voltage $u_0$. Indeed, the control voltage $u_0$ may be expressed in a rotor reference frame or a stator reference frame. Typically the control voltage $u_0$ is initially determined in an estimation of the rotor reference frame, before being converted to the stator reference frame. The control voltage $u_0$ expressed in the stator reference frame defines the voltages to be applied to the stator windings to obtain the desired speed or torque from the motor 14.

Returning to FIG. 2, the control method comprises, at step 102, injecting a high frequency signal $S_0$ into the control voltage $u_0$ to obtain an excitation voltage $u_1$. The excitation voltage $u_1$ is the combination of the control voltage $u_0$ and the high frequency signal $S_0$. In other word, the high frequency signal $S_0$ integrates the control voltage $u_0$.

The high frequency signal $S_0$ could be a signal comprising multiple frequencies, in particular a fundamental frequency and any number of harmonic frequencies. For example, the high frequency signal $S_0$ may be a square wave signal. The use of a square wave signal simplifies the synthetization of the high frequency signal $S_0$. Alternatively, the high frequency signal $S_0$ could be a sinusoidal signal or any other shape signal.

The one or more frequencies of the high frequency signal $S_0$ vary with time. The one or more frequencies of the high frequency signal $S_0$ vary randomly with time. In other words, the one or more frequencies of the high frequency signal $S_0$ do not follow a repeating pattern. The random variations of the high frequency signal $S_0$ spreads the spectra of acoustic noise produced in the motor 14 when the excitation voltage $u_1$ is applied to the motor 14. A reduction in the audible noise produced in the motor 14 may be achieved.

The one or more frequencies of the high frequency signal $S_0$ are superior to a frequency bandwidth of the current controller used to determine control voltage $u_0$ at step 101. Thus, the high frequency signal $S_0$ does not interfere with the desired operation of the motor 14. As an example, the fundamental frequency of the high frequency signal $S_0$ can vary between 250 Hz and 1 kHz.

In the example illustrated, the high frequency signal $S_0$ is injected in the estimated rotor reference frame. Alternatively, the high frequency signal $S_0$ could be injected in the stator reference frame. Further, the high frequency signal $S_0$ could be injected in either orthogonal components forming the control voltage $u_0$.

The control method comprises, at block 103, converting the excitation voltage $u_1$ to a pulse width modulated voltage $u_{pwm}$. Converting the excitation voltage $u_1$ to a pulse width modulation voltage $u_{pwm}$, uses a pulse width modulation carrier $u_{car}$. Using the pulse width modulation carrier $u_{car}$ refers to modulating the excitation voltage $u_1$ with the pulse width modulation carrier $u_{car}$.

The frequency of the pulse-width modulated carrier $u_{car}$ is superior to the fundamental frequency of the high frequency signal $S_0$. For example, the pulse-width modulated carrier $u_{car}$ may have a frequency between 2 and 16 kHz. The fundamental frequency of the high frequency signal $S_0$ is therefore within an interval defined by the frequency bandwidth of the current controller and the frequency of the pulse-width modulated carrier $u_{car}$. Preferably, the fundamental frequency of the high frequency signal $S_0$ is close to the frequency of the pulse-width modulated carrier $u_{car}$, so as not to disturb the desired operation of the motor 14.

It should be noted that FIG. 2 shows a single phase control system 22. This is only for simplification. Typically, the electric motor 14 will be a three-phase motor. In this case, converting the excitation voltage $u_1$ at step 103 generates a pulse width modulated voltage $u_{pwm}$ for each of the three phases of the motor 14.

The control method comprises, at step 104, applying the excitation voltage $u_1$ to the motor 14. Here, the excitation voltage $u_1$, in the form of the pulse-width modulated voltage $u_{pwm}$ is sent to the converter 20 of the variable speed drive 12 to operate the motor 14. The motor 14 will react to the excitation voltage $u_1$ by rotating at a speed w and producing current y in stator windings.

The control method comprises, at step 106, measuring the current y induced by the motor 14 during operation. As noted above, current measurements are provided by the variable speed drive 12. The current y measured at step 106 comprises a fundamental current $y_a$ and a disturbance current $y_b S_1$.

The fundamental current $y_a$ is that induced by the control voltage $u_0$. The fundamental current $y_a$ would be measured without injecting the high frequency signal $S_0$ at step 102. The fundamental current $y_a$ may be fed back to the control step 101 to update the control voltage $u_0$. In particular, the fundamental current $y_a$ may be used by the current controller.

The disturbance current $y_b S_1$ is that induced by the high frequency signal $S_0$. The disturbance current $y_b S_1$ is the primitive $S_1$ of the injected high frequency signal $S_0$ modulated in amplitude by a ripple $y_b$. An amplitude of the ripple $y_b$, is the amplitude of the motor's response to the high frequency signal $S_0$, and contains the information on the state of the motor used at step 101 to determine the control voltage $u_0$. Thus, the amplitude of the ripple $y_b$ may be fed back to the control block 101 to update the control voltage $u_0$. In particular, the amplitude of the ripple $y_b$ may provide the speed ω and flux Φ used by the speed controller and the flux controller.

The method comprises, at step 107, demodulating the current y measured at step 106. Demodulating the current y comprises separating the disturbance current $y_b S_1$ from the fundamental current $y_a$. Demodulating the current y also comprises determining the amplitude of the ripple $y_b$ of the disturbance current $y_b S_1$. The fundamental current $y_a$ and amplitude of the ripple $y_b$ can thus be fed back to the control step 101 to update the control voltage $u_0$. As mentioned above, the control system 22 is a closed loop control system 22.

Figure 4:
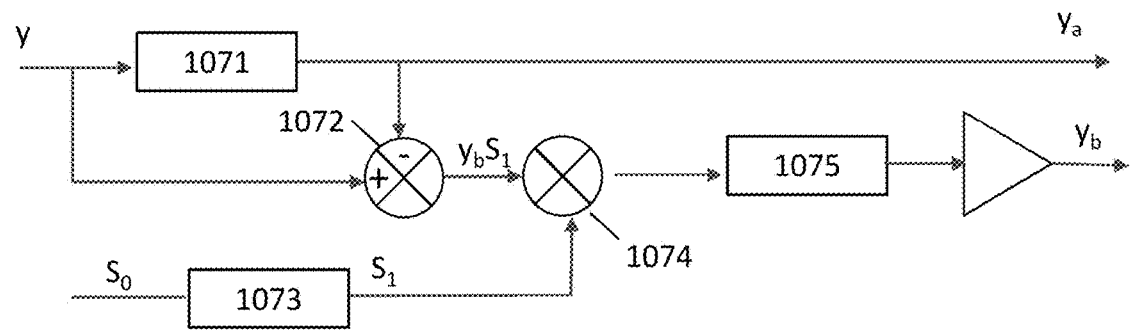
FIG. 4 schematically illustrates another detail of the control system of FIG. 2.

Block 107 of demodulating the signal is shown in more detail in FIG. 4.

As shown in FIG. 4, demodulating the current y comprises, at block 1071, applying a first finite impulse response (FIR) filter to the current signal y. A response of an FIR filter is of finite duration, and does not rely on previous inputs to the filter. The duration of the response from the first impulse response filter can therefore be adapted to the one or more frequencies of the high frequency signal $S_0$. The duration of the response from the first impulse response filter can correspond to the one or more frequencies of the high frequency signal $S_0$. The finite impulse response filter can thus suitably remove the disturbance current $y_b S_1$ from the current y. The fundamental current $y_a$ may be extracted from the current y.

Demodulating the current further comprises, at step 1072, subtracting the fundamental current $y_a$ from the current y. Thus, the disturbance current $y_b S_1$ is separated from the current y. The disturbance current $y_b S_1$ may be extracted from the current y.

Demodulating the current y comprises determining the amplitude of the ripple $y_b$, which carries the information on the state of the motor 14. Thus, the actual speed ω and flux Φ used by the speed controller and the flux controller at step 101 may be determined from the amplitude of the ripple $y_b$.

Determining the amplitude of the ripple $y_b$ comprises calculating, at step 1073, the zero mean primitive $S_1$ of the high frequency signal $S_0$. By zero-mean primitive $S_1$, it is to be understood the primitive which is zero in average over each period of the high frequency signal $S_0$.

Determining the amplitude of the ripple $y_b$ comprises, at step 1074 multiplying the zero mean primitive $S_1$ of the high frequency signal $S_0$ with the disturbance current $y_b S_1$. It should be noted that multiplying the zero mean primitive $S_1$ of the high frequency signal $S_0$ with the disturbance current $y_b S_1$ also comprises taking the transpose of the zero mean primitive $S_1$ of the high frequency signal $S_0$. The ripple $y_b$ may thus be extracted from the disturbance current $y_b S_1$.

Determining the amplitude of the ripple $y_b$ comprises, at step 1075, applying a second finite impulse response to the ripple $y_b$. In other words, step 1075 comprises taking a sliding average of the disturbance current $y_b S_1$ multiplied by the zero mean primitive $S_1$. The sliding average corresponds to the amplitude of the ripple $y_b$. As discussed above, the finite impulse response filter is particularly adapted to the varying frequency or frequencies of the disturbance current $y_b S_1$.

Figure 5:
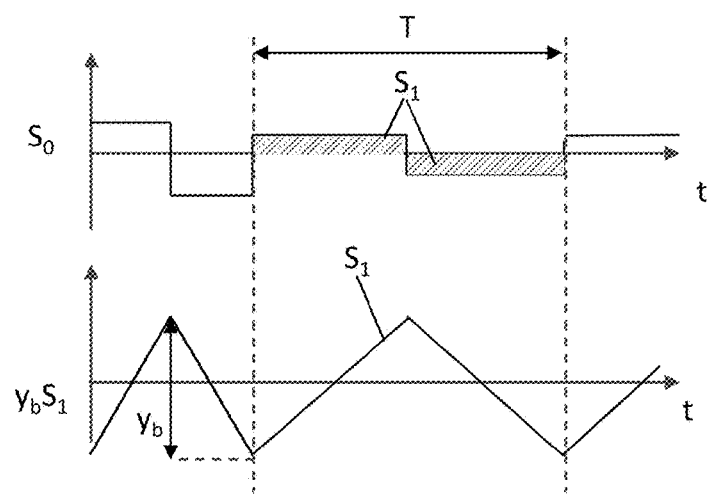
FIG. 5 illustrates an example of signals used in the control system of FIG. 2.

FIG. 5 illustrates an example of a high frequency signal $S_0$ which may be injected into the control voltage $u_0$ at step 102 and the disturbance current $y_b S_1$ induced as a result of the injected high frequency signal $S_0$.

Here, the high frequency signal $S_0$ is a square wave signal. When the high frequency signal $S_0$ is a square wave signal, the zero-mean primitive $S_1$ of the high frequency signal $S_0$ may be easily calculated when demodulating the disturbance current $y_b S_1$ at step 1073.

As illustrated, the disturbance current $y_b S_1$ is a triangular signal, primitive $S_1$ of the high frequency signal $S_0$ modulated in amplitude by the ripple $y_b$. The ripple $y_b$ may be extracted using the primitive $S_1$ of the injected signal $S_0$ as discussed above.

Further, in the illustrated example, the frequency of the disturbance current $y_b S_1$ is high for a first duration T1, and low for a second duration T2. The duration of the response of the first and second finite impulse response filters applied at steps 1071 and 1075 may be adapted to the first duration T1, and then be adapted to the second duration T2. Thus, current demodulation is suited to the varying frequency or frequencies of the current y induced by the high frequency signal $S_0$.

The present disclosure is not limited to the only examples described above but is susceptible to variations accessible to the man skilled in the art. For example, further signal processing blocks, such as amplification, filtering, logic steps can be implemented in the control method.

The invention claimed is:

1. A method for sensorless control of an electric motor implemented in a variable speed drive, the method comprising:
   determining a control voltage to be applied to the motor;
   injecting a high frequency signal to the control voltage to obtain an excitation voltage, wherein one or more frequencies of the high frequency signal varies with time;
   applying the excitation voltage to the motor;
   measuring a current signal induced in the motor by the excitation voltage, wherein the current signal comprises a fundamental current, induced by the control voltage, and a disturbance current, induced by the high frequency signal; and
   demodulating the current signal, wherein demodulating the current signal comprises:
      applying a first finite impulse response filter to the current signal to extract the fundamental current, wherein a duration of a response from the first finite impulse response filter varies according to the one or more frequencies of the high frequency signal;
      subtracting the fundamental current from the current signal to extract the disturbance current; and
      determining an amplitude of a ripple of the disturbance current, the amplitude of the ripple depending on a state of the motor.

2. The method according to claim 1, wherein determining the amplitude of the ripple comprises calculating a zero-mean primitive of the high frequency signal and multiplying the disturbance current by the zero-mean primitive.

3. The method according to claim 2, wherein determining the amplitude of the ripple further comprises applying a second finite impulse response filter, wherein a duration of a response from the second finite impulse response filter varies according to the one or more frequencies of the high frequency signal.

4. The method according to claim 1, wherein the one or more frequencies of the high frequency signal vary randomly with time.

5. The method according to claim 1, wherein the high frequency signal is a sinusoidal signal.

6. The method according to claim 1, wherein the high frequency signal is a square wave signal.

7. The method according to claim 1, wherein determining the control voltage comprises using a current controller, applying the excitation voltage to the motor comprises converting the excitation voltage to a pulse width modulation voltage using a pulse width modulation carrier, and a fundamental frequency of the high frequency signal is within an interval defined by a frequency bandwidth of the current controller and a frequency of the pulse width modulation carrier.

8. The method according to claim 7, wherein the fundamental frequency of the high frequency signal varies between 250 Hz and 1 kHz.

9. The method according to claim 1, wherein the control voltage is determined in an estimated rotor reference frame of the motor, and the high frequency signal is injected into the estimated rotor reference frame.

10. The method according to claim 1, further comprising forming a feedback loop by updating the control voltage with the amplitude of the ripple and the fundamental current.

11. A variable speed drive of an electric motor comprising a processor and a memory, the processor being configured to operate according to the method of claim 1.

12. An electric drive assembly comprising the variable speed drive according to claim 11 and an electric motor controlled by said variable speed drive.

13. A non-transitory computer-readable storage medium comprising instructions which, when executed by a processor, cause the processor to carry out the method of claim 1.

* * * * *